(12) United States Patent
Morelli et al.

(10) Patent No.: US 11,536,608 B2
(45) Date of Patent: Dec. 27, 2022

(54) SYSTEMS AND METHODS FOR CHARACTERIZING SPECTRAL REFLECTANCE OF REAL WORLD OBJECTS

(71) Applicant: Argo AI, LLC, Pittsburgh, PA (US)

(72) Inventors: Michael V. Morelli, San Jose, CA (US); Laurens M. Schouten-Evers, San Francisco, CA (US); Minseok Oh, San Jose, CA (US)

(73) Assignee: Argo AI, LLC, Pittsburgh, PA (US)

(*) Notice: Subject to any disclaimer, the term of this patent is extended or adjusted under 35 U.S.C. 154(b) by 124 days.

(21) Appl. No.: 17/140,969

(22) Filed: Jan. 4, 2021

(65) Prior Publication Data

US 2022/0214217 A1    Jul. 7, 2022

(51) Int. Cl.
*G01J 3/02* (2006.01)
*G01J 3/28* (2006.01)
*G01J 3/42* (2006.01)
*G01J 3/10* (2006.01)

(52) U.S. Cl.
CPC ............... *G01J 3/42* (2013.01); *G01J 3/0208* (2013.01); *G01J 3/108* (2013.01); *G01J 3/2823* (2013.01); *G01J 2003/425* (2013.01)

(58) Field of Classification Search
CPC .................. G01J 3/2823; G01J 2003/425
See application file for complete search history.

(56) References Cited

U.S. PATENT DOCUMENTS

| | | | |
|---|---|---|---|
| 5,450,125 A | 9/1995 | Ulich et al. | |
| 7,026,600 B2 | 4/2006 | Jamieson et al. | |
| 7,746,450 B2 | 6/2010 | Willner et al. | |
| 9,247,215 B1 | 1/2016 | Athan | |
| 9,448,110 B2 | 9/2016 | Wong | |
| 9,555,740 B1 | 1/2017 | Zhu et al. | |

(Continued)

FOREIGN PATENT DOCUMENTS

| | | |
|---|---|---|
| KR | 1020140134395 A | 11/2014 |
| WO | 2015125022 A2 | 8/2015 |
| WO | 2020033749 A1 | 2/2020 |

OTHER PUBLICATIONS https://integrys.com/product/resonon-pika-nir-320-hyperspectral-imaging-camera/ (Year: 2020).*

(Continued)

*Primary Examiner* — Hina F Ayub
(74) *Attorney, Agent, or Firm* — Brooks Kushman, P.C.

(57) ABSTRACT

Systems, methods, and computer-readable media are disclosed for a systems and methods for intra-shot dynamic LIDAR detector gain. One example method my include receiving first image data associated with a first image of an object illuminated at a first wavelength and captured by a camera at the first wavelength, the first image data including first pixel data for a first pixel of the first image and second pixel data for a second pixel of the first image. The example method may also include calculating a first reflectance value for the first pixel using the first pixel data. The example method may also include calculating a second reflectance value for the second pixel using the second pixel data. The example method may also include generating, using first reflectance value and the second reflectance value, a first reflectance distribution of the object.

20 Claims, 4 Drawing Sheets

(56) References Cited

U.S. PATENT DOCUMENTS

| | | | |
|---|---|---|---|
| 10,441,176 B2 | 10/2019 | Islam | |
| 2007/0206242 A1* | 9/2007 | Smith | H04N 3/1593 |
| | | | 348/E3.032 |
| 2012/0307081 A1* | 12/2012 | Dewald | G01J 3/10 |
| | | | 348/E5.029 |
| 2013/0027702 A1* | 1/2013 | Kawamata | G06V 20/56 |
| | | | 356/326 |
| 2017/0131718 A1 | 5/2017 | Matsumura et al. | |
| 2017/0293016 A1 | 10/2017 | McCloskey et al. | |
| 2018/0106676 A1* | 4/2018 | Jang | G01N 21/31 |
| 2018/0270474 A1 | 9/2018 | Liu | |
| 2018/0322644 A1* | 11/2018 | Sunkavalli | G01N 21/55 |
| 2019/0277703 A1 | 9/2019 | Valouch et al. | |
| 2019/0293489 A1* | 9/2019 | Oh | G01J 3/42 |

OTHER PUBLICATIONS

International Search Report for PCT/US2021/060933 dated Mar. 21, 2022, 3 pages.
Yan et al. "Scan Line Intensity-Elevation Ratio (SLIER): An Airborne LiDAR Ratio Index for Automatic Water Surface Mapping", Remote Sensing, Apr. 4, 2019, pp. 1-20, vol. 11, issue 7, Canada.

\* cited by examiner

SYSTEMS AND METHODS FOR CHARACTERIZING SPECTRAL REFLECTANCE OF REAL WORLD OBJECTS

BACKGROUND

Knowing the spectral reflectivity and/or reflectance of real world objects may be important for determining and adjusting the performance of a sensor or sensors in a system, such as a LIDAR system. In conventional practice, spectral reflectance may typically be measured using a spectrometer. Spectrometers, however, may often be configured to only determine reflectance for objects at a specific angle, which may be normal to a flat surface of the object. This may work well for highly diffuse or highly specular objects, however, real world objects have an angle dependent reflectivity (BRDF). That is, the use of the spectrometer may not be ideal for capturing the reflectance values for the entirety of the object, rather than at the one specific point on the object, especially when the object is non-flat and has an associated curvature.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
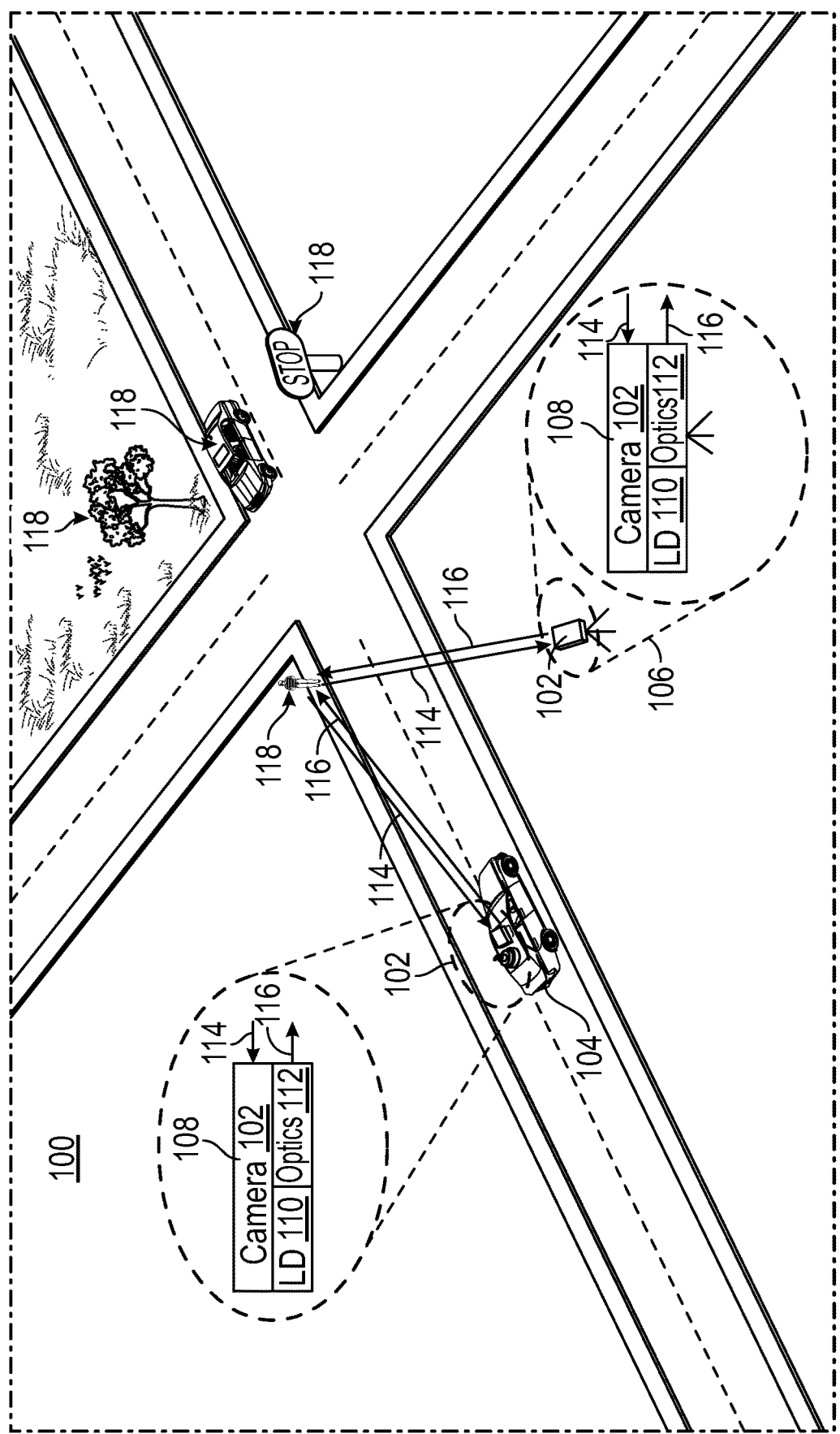
FIG. 1 depicts a schematic illustration of an example system implemented in an environment, in accordance with one or more example embodiments of the disclosure.

Disclosed herein are systems and methods for characterizing spectral reflectivity and/or reflectance of real world objects. More particularly, the systems and methods described herein may allow for a reflectance distribution for a real-world object to be determined, where the objects may have a natural curvature or may otherwise be non-flat in nature A reflectance distribution may refer to a mapping of the reflectance of an object as a whole. For example, the reflectance distribution may provide a mapping of the reflectance of the object at various points on the object, including when the object is at different angles with respect to a light source. Additionally, the reflectivity or reflectance (in some cases, these terms may be used interchangeably herein) of an object may refer to the object's overall ability to reflect light that hits the object. The reflectance of an object may be non-uniform, such that the reflectance may change depending on the angle at which light strikes the object and/or other properties of the object such as its shape and material composition. The reflectance may also depend on other external factors beyond the properties of the object itself, such as the wavelength and/or polarization state of the light striking the object. Thus, it may be important to understand how the reflectance of the object changes depending on these object properties and other external factors. This may be especially important in applications such as LIDAR systems (e.g., LIDAR systems implemented in autonomous or semi-autonomous vehicles). Such LIDAR systems may be configured to provide range information for objects in an environment. Not taking into account the reflectance of an object may potentially result in the LIDAR system not performing valid range return determinations. That is, the LIDAR system may be inaccurate in making range determinations for objects if the LIDAR system does not correctly account for how light will reflect from object at various points and angles, and also based on external factors as described above.

In some embodiments, conventional methods for determining the reflectance of an object, even in the LIDAR context, may involve the use of a spectrometer. However, spectrometers are typically configured to focus on one specific angle of an object at a time, and typically this angle is of a normal incidence to a surface of the object. Additionally, the object being measured by the spectrometer must typically also be flat. Some spectrometers may be able to focus on discrete angles of an object, but even this may not allow the spectrometer to capture what real objects look like because spectrometers typically only provide measurements of one pixel at a time. Thus, the spectrometer would have to individually measure hundreds of different points on the object in order to develop a more overall reflectance distribution map of the object. This makes it difficult for a spectrometer to efficiently and effectively determine the reflectance of the object as a whole.

In some embodiments, the systems and methods described herein improve upon the above-mentioned shortfalls of spectrometer reflectance measurements by providing a system (which may be referred to as a reflectance measurement system herein) that is capable of producing a reflectance distribution mapping (in addition to other reflectance information) for an entire object using only a single image capture. In some embodiments, the reflectance measurement system may be a portable, standalone system. For example, in the standalone configuration, the reflectance measurement system may be held by an operator or attached to a tri-pod when reflectance measurements are taken for real-world objects. In some instances, the reflectance measurement system may alternatively be integrated into another existing system, such as a LIDAR system of a vehicle. In this particular example, the reflectance measurement system can be a separate tool that captures reflectance information for objects and this information may be used to supplement the operations of the vehicle LIDAR system.

The systems and methods described herein may be used for other purposes as well. A first example purpose may include validation of estimated reflectivity data that is generated by the LIDAR. With respect to this first example, data may be collected for a particular object with the calibrated spectral reflectance tool, and the data may be compared to the data that the LIDAR generates for the same object. A second example purpose may include the generation of generalized requirements. If the reflectivity or reflectivity distribution data is obtained for important targets, this information may be used to create requirements. For instance, if it is known that a bicycle needs to be able to be detected by the LIDAR from 5 m to 100 m, the reflectivity can be measured. It should be noted that the use of the reflectance measurement system in the LIDAR context is merely an example, and the reflectance measurement system may be implemented in any number of other contexts as well.

In terms of hardware components, in an illustrative embodiment, the reflectance measurement system may include at least an emitting device, one or more cameras, and one or more optical elements. The emitting device may be a laser diode or similar component that is capable of emitting light as a continuous wave or in pulses. The light may be emitted at a particular wavelength, and the wavelength may either be fixed or dynamic in that different wavelengths may be emitted at different times and/or different wavelengths may be emitted simultaneously. It may be desirable for the wavelength of the emitted light to be dynamic because the reflectance of an object may differ depending on the wavelength of the light that strikes the object. Thus, capturing data regarding how the reflectance of an object will differ at various wavelengths that fall into different spectrums may be important. For example, objects illuminated by neon light or light emitting diode (LED) light may be associated with differing spectral profiles. Returning to the example of the vehicle LIDAR system, it may be important for sensors in the LIDAR system to be able to function in artificial light, so understanding how reflectance of an object may change under different types of illumination may be important. This emitted light may be directed towards an object of interest (e.g., a real-world object) and may be used to illuminate the object of interest at the wavelength.

In some embodiments, subsequent to being emitted from the emitting device, the emitted light may pass through one or more optical elements before exiting the reflectance measurement system. The optical elements may be used to alter the properties of the emitted light. For example, the optical elements may include a collimator and/or a first waveplate, although any other number and/or combination of optical elements may be used as well. The collimator may be used to reduce the divergence of the emitted light, which may serve to ensure that more of the emitted light reaches the object of interest rather than some of the light diverging outwards and missing the object. The first waveplate may be used to adjust the polarization state of the emitted light. Adjusting the polarization state of the light may be important because the reflectance of an object may also depend on the polarization state of the light that strikes it. Returning again to the particular example in the LIDAR context, different LIDAR systems may be more sensitive to different types of polarized light, so in order for the LIDAR system to perform valid range measurements it may need data regarding how the reflectance of the object changes based on light being in that polarization state. Additionally, beyond understanding how the reflectance changes in the particular polarization state, it may be useful to also determine how the reflectance of the object changes in all polarization states of light. Having data regarding the reflectance of the object with respect to light in all polarization states may provide a more vast knowledge base with regards to the reflectance of the object, as not all systems that may use the reflectance data may desire data regarding light in the same polarization state.

In some embodiments, once the object is illuminated using the particular wavelength of light, the camera may be used to capture an image of the illuminated object. Specifically, the camera may be configured to capture light at the particular wavelength that is used to illuminate the object. For example, if the wavelength of the emitted light is in the near infrared (NIR) spectrum of 780 nm to 2500 nm, the camera may be configured to capture light within this NIR spectrum as well. Additionally, more than one camera may be used, and each camera may be capable of capturing light within any number of spectrums, such that the reflectance measurement system may be able to capture images in more than one spectrum at the same time. Additionally, one or more optical elements may also be placed in a path of any return light traveling towards the camera (e.g., optical elements that alter light before it is captured by the camera). For example, these optical elements may include at least a second waveplate, a bandpass filter, a neutral density filter, and/or a lens, although any other number and/or combination of optical elements may be used as well. The second waveplate may be used in a manner similar to the first waveplate. That is, the second waveplate may be used to ensure that the light being captured by the camera is of a particular polarization state. The use of the second waveplate may be important even though the first waveplate exists to adjust the polarization state exiting the reflectance measurement system because the light that reflects from the object and back towards the camera in the reflectance measurement system may be of mixed polarization (that is the light may return in multiple polarization states, such as p polarized light and s polarized light, for example). Thus, it may be important to ensure that only the light of the desired polarization state is captured by the camera to ensure that the correct reflectance data for that polarization state is captured. For example, if it is desired to know the reflectance of the object based on p polarized light, then the second waveplate may ensure that the p polarized return light is captured by the camera. Similar to the second waveplate, the bandpass filter may be used to ensure that only the desired light is being captured by the camera. More specifically, the bandpass filter may serve to only allow light within a particular range of wavelength(s) (or a single wavelength) to pass through to the camera. This range of wavelengths may include the wavelength of the emitted light. That is, the bandpass filter may serve to block unwanted wavelengths of light from being captured by the camera to ensure that only relevant information is captured. For example, if the emitted wavelength is 905 nm, then the bandpass filter may allow 905 nm wavelength light to pass through, but may block light with a wavelength below 905 nm or above 905 nm. A neutral density filter ("NDF") may be an additional optical element that may be configured to reduce the amount of return light that enters the camera. In other words the NDF may "darken" the environment by reducing the number of photons that are able to pass through the NDF and towards the camera. This may serve the benefit of mitigating the chance that the return light may saturate the camera. Finally, the lens may be used to focus returned light on the camera. In some instances, the NDF may also be used to "brighten" an object if a larger lens is used. Additional details regarding the hardware configuration of the reflectance measurement system may be described below with respect to at least FIGS. 1 and 2.

In some embodiments, once the image of the illuminated object is captured, the image may be provided to a computing system (for example, the computing portion 513 described with respect to FIG. 5 below) that may be used to determine reflectance information from the captured image. For example, the computing system may be able to use the image to determine a reflectance distribution mapping that may provide an indication of the reflectance of the object at various points and angles along the surface of the object. The computing system may also be able to determine other information, such as an average overall reflectance of the object, which, for example, may be represented as a numeric value. The computing system may also be able to determine a spatial distribution and/or a statistical distribution for the object, among other information. Reflectance information of the object will be determined through the intensity of given individual pixels and calibration of the system. For example, calibration may be performed by observing targets of known reflectivity under a variety of conditions (e.g., known distances to the object). This will generate coefficients for each pixel which may be used to calculate an accurate estimate of the reflectivity of an object for a given intensity value. Once the information is obtained, it may presented in any number of different forms. For example, the reflectance distribution of the object may be presented as a histogram. The histogram may include reflectance values for individual camera pixels on the object of interest. This may allow for the graphical interrogation of statistical properties. Some objects may have a very tight distribution, which may indicate that they are relatively uniform in reflectivity, whereas other objects, such as cars, may have a broad distribution.

Once all of this relevant information is determined based on the captured image, it may be stored locally within the reflectance measurement system and/or remotely to the reflectance measurement system. In some instances, the information may be stored in a database (which may be referred to interchangeably herein as a "library," "object library," or the like). The database may include the full spatial reflectivity distribution for a variety of objects. One use case would be to generate a 3D model of a given object with the measured reflectivity distribution mapped onto the 3D model. This could be used with other LIDAR modeling tools to predict what a certain class of objects would look like in the point cloud of a given LIDAR. As one non-limiting example, the database may be similar to a computer-aided design (CAD) database with solid models of the objects along with their reflectivity data. The database may also include classifications of objects (e.g., a car, a tree, a pedestrian, a vehicle, or any other real-world object that may be encountered in an environment), and the reflectance information for an object may be added to the database entries the object classification associated with that object. The database may also include other information relating to the conditions under which the reflectance measurement system and LIDAR system capture reflectance information for an object, such as the range to the object, the ambient lighting conditions, etc. Thus, the determined reflectance information associated with the object may serve as supplemental information that provides an additional base of knowledge with respect to the object classification. As mentioned above, this may be especially useful in vehicle LIDAR systems, as the LIDAR system may be able to make more accurate range determinations if the reflectance of a particular object is known for various points on the object at various angles (among other factors, such as the wavelength used, the polarization state of the light, etc.). In other words, the reflectance measurement system may be used to compile a library or catalog of reflectance information (for example, which may be stored in the database as described above, or may alternatively be stored in any number of other locations) for particular objects that may be encountered by a LIDAR system in an environment. This catalog may then be accessible to the LIDAR system such that the LIDAR system may access reflectance distribution information in real-time for objects that the LIDAR system may encounter while functioning in the real world. The reflectance information may also be used to verify the functioning of a LIDAR system. For example, the LIDAR system and the reflectance measurement system can both be used to image an object under the same conditions. and the reflectance information obtained by the reflectance measurement system can be compared to the reflectance information obtained by the LIDAR system. Based on this comparison, it may be determined if the LIDAR system is functioning within a threshold level of performance. If not, adjustments may be made to the LIDAR system.

In some embodiments, the reflectance measurement system may be calibrated before it is used to determine reflectance distribution mappings for various real-world objects as described above. The calibration may involve using the reflectance measurement system in the same manner in which it would be used to capture images of real-world objects under normal operation, but instead may involve capturing images of test objects with known reflectance data. Thus, the reflectance measurement system may capture an image of a particular test object, determine the reflectance distribution mapping of the object, and compare the determined reflectance distribution mapping to the known reflectance distribution mapping. If the determined and known reflectance information is identical or only differ by a threshold amount, then additional calibration may not be required and the reflectance measurement system may be deemed ready for use on real-world objects. However, if the determined and known reflectance information is not identical or differ by more than the threshold amount, then the reflectance measurement tool may need to be adjusted, and the calibration process may need to be performed again to determine if the adjustment results in more accurate reflectance distribution mappings. For example, the adjustments may include modifying the process for calibrating the tool, or changing some other aspect of how the calibration is being applied (e.g. more bits, changing from an equation to a look-up table based calibration, etc.). Additionally, instead of using just on test object, multiple test objects with different reflectance distribution mappings may be used to further verify the accuracy of the reflectance measurement system. This calibration process for the reflectance measurement system may be described in more detail with respect to FIG. 3 below.

With reference to the figures, FIG. 1 depicts a schematic illustration of an example reflectance measurement system 102 as implemented in an example environment 100. In some embodiments, the reflectance measurement system 102 may be a system used for determining the spectral reflectance of one or more objects 118 in the environment 100. The reflectance measurement system 102 may include at least a camera 108, an emitting device 110, and one or more optical elements 112. In some instances, the reflectance measurement system 102 may be implemented on or in a number of pre-existing systems, such as a on a vehicle 104. In other instances, the reflectance measurement system 102 may be implemented as a stand-alone system, such as on a tri-pod 106 or simply operable by a user without being implemented on an element such as the tri-pod 106. That is, the reflectance measurement system 102 may be a portable tool that may be carried into an environment 100.

In some embodiments, the emitting device 110 of the reflectance measurement system 102 may be used to emit light (e.g., emitted light 116) into the environment 100 and towards an object 118. The object 118 may be any object in the environment 100 for which it is desired to obtain a reflectance distribution mapping. For example, as depicted in FIG. 1, the object 118 may be a pedestrian, a tree, another vehicle, a road sign, and/or any other object. In some instances, the emitting device 110 may be a laser diode, and may be capable of emitting light as a continuous waveform or as a series of pulses. The emitted light 116 may also be at a particular wavelength, which may be fixed or may also be dynamic. For example, the wavelength of the emitted light 116 may be changed if it is desired to illuminate an object 118 with light in a different spectrum. For example, at a first time light may be emitted at a wavelength of 900 nm, which falls in the NIR spectrum, and at a second time light may be emitted at a wavelength of 607, which may represent neon orange in the visible spectrum. The reflectance of the object 118 may differ depending on the wavelength of the light that illuminates the object 118, so it may be valuable to determine how the reflectance will be impacted in different spectrum (or even among different wavelengths in the same spectrum).

In some embodiments, subsequent to being emitting from the emitting device 110, and prior to reaching the environment 100, the emitted light 116 may pass through one or more optical elements 112 housed within the reflectance measurement system 102. The one or more optical elements 112 may serve to alter the emitted light 116 before it enters the environment 100. For example, the one or more optical elements 112 may collimate the emitted light 116 to reduce a divergence of the emitted light 116, may focus the emitted light 116, and/or may alter the polarization of the emitted light 116, and/or may perform any other alterations on the light prior to the light exiting the reflectance measurement system 102. Examples of such optical elements 112 may be described in more detail below with respect to FIG. 2. In some embodiments, one or more additional optical elements 112 may also be used to alter light before it is captured by the camera 108. For example, at a high-level these additional optical elements 112 may filter returning light 114 from the environment 100 such that the camera is only capturing light that may be useful for determining the reflectance distribution of the object 118. These and other optical elements 112 may be specifically described in more details with respect to FIG. 2 below.

In some embodiments, the camera 108 may be used to capture return light 114 from the environment 100. In other words, the camera 108 may be used to capture an image of an object 118 at which the emitted light 116 is directed. That is, the emitted light 116 may be used to illuminate the object 118 at the wavelength of the emitted light 116, and the camera 108 may be used to capture an image of the object 118 while it is illuminated by the emitted light 116 at the wavelength. Accordingly, the type of camera 108 that is used in the reflectance measurement system 102 may depend on the spectrum in which the wavelength of the emitted lights 116 falls. This may be to ensure that the camera 108 is able to capture the image of the object 118 at the particular wavelength that is used to illuminate the object 118. For example, the wavelength of the emitted light 116 may be 905 nm. This may fall in the NIR spectrum, which may include wavelengths in the range of 780 nm to 2500 nm. With this particular wavelength of emitted light 116, the camera 108 may be an NIR camera. However, other wavelengths may be used that may fall into other spectrums as well. For example, the wavelength may fall in the visible spectrum of 380 nm to 740 nm. In such cases, the camera 108 may be a visible light camera instead of an NIR camera. Additionally, in some instances multiple cameras 108 may be used to capture illuminations that are at different wavelengths in different spectrums, or simultaneously capture an illumination in one wavelength or multiple wavelengths at the same time.

In some embodiments, the purpose of using the reflectance measurement system 102 as described above (e.g., to illuminate an object 118 at a wavelength and to capture an image of the object 118 while being illuminated) may be to determine the reflectance of the object 118 as it exists in the real world. This may be especially important if the object 118 is non-flat and has a natural curvature to it (as well as any other type of non-flat variations that may exist in typical real-world objects). In other words, the reflectance measurement system 102 may be used to determine the reflectance of the object 118 as a whole, including at various points on the object and when the object is at various angles depending on the direction from which the object 118 is viewed. Beyond this, the reflectance measurement system 102 may also be able to provide reflectance data for an object 108 at different light source illumination wavelengths, light polarization states, etc. That is, all of these aforementioned factors may impact the reflectance of the object 118 and having data regarding how the reflectance of the object 118 may change as these factors change may be valuable. Additionally, all of all this data may be obtained through a single image capture by the camera 108. Having such reflectance data for the object 118 may be far more valuable compared to data that may be obtained through conventional methods, such as a spectrometer as discussed above, as the spectrometer typically only measures single points of reflectance at a single angle (normal with respect to a surface of the object). Having this data may be more valuable because object reflectance in the real-world may be highly variable and relying on a single point of reflectance as measured by a spectrometer may not be sufficient to effectively determine how light is going to reflect from the object based on the multiplicity of aforementioned factors that can impact the way light is reflected from the object 118. In some embodiments, as described below with respect to FIG. 2, this reflectance data may be stored in a number of forms, such as a reflectance distribution mapping, a histogram, etc. The histogram may show the distribution of reflectivity values for a given object. Statistical information may be deduced for the reflectivity for a given object. For example, object A may have a mean reflectivity of 40%, normally distributed with a range of 35-45%. The histogram may enable decision making on how wide or narrow the distribution is for given objects and inform decisions on how the perception stack uses that information. A pedestrian may have a much smaller reflectivity distribution than say a car, so the perception stack could use that information to help detect and classify objects. In some instances, other information may be stored in addition to the reflectance distribution as well. For example, an average reflectance value for the object may be stored, a spatial reflectance distribution may be stored, and/or a statistical reflectance distribution may also be stored, among other information. The statistical representation may include parameters like the mean and standard deviation. These may be a simplified representation of the data for the object. The spatial distribution may effectively be the full dataset that is collected with the tool. The spatial distribution could be used as a filter in the perception pipeline to help identify the reflectivity distribution signature of specific classes of objects (e.g. pedestrians, cars, etc.), aiding in detection and classification tasks. The calibration could take a number of forms and would require some development to find the optimal solution. Generally, there may be two options: a look-up table, or an equation based calibration. The look-up table could be an N-dimensional table which may provide information regarding what the raw intensity value from the spectral reflectance tool should be (on a per pixel basis) for a given reflectivity at a given range. There may be additional dimensions for things like temperature, polarization state, or any other parameter that has an impact on the intensity value returned by the tool which needs to be considered. Then an object is measured in the real world, the intensity returned by the tool may be used in addition to the other parameters which may be known (for example, range, temperature, etc.) to back out the equivalent reflectivity based on the calibration. If a polynomial equation that accurately estimates the information in the table can be determined, that can be used instead of the look-up table. The benefit being that multi-dimensional look-up tables can take up a lot of memory.

Figure 2:
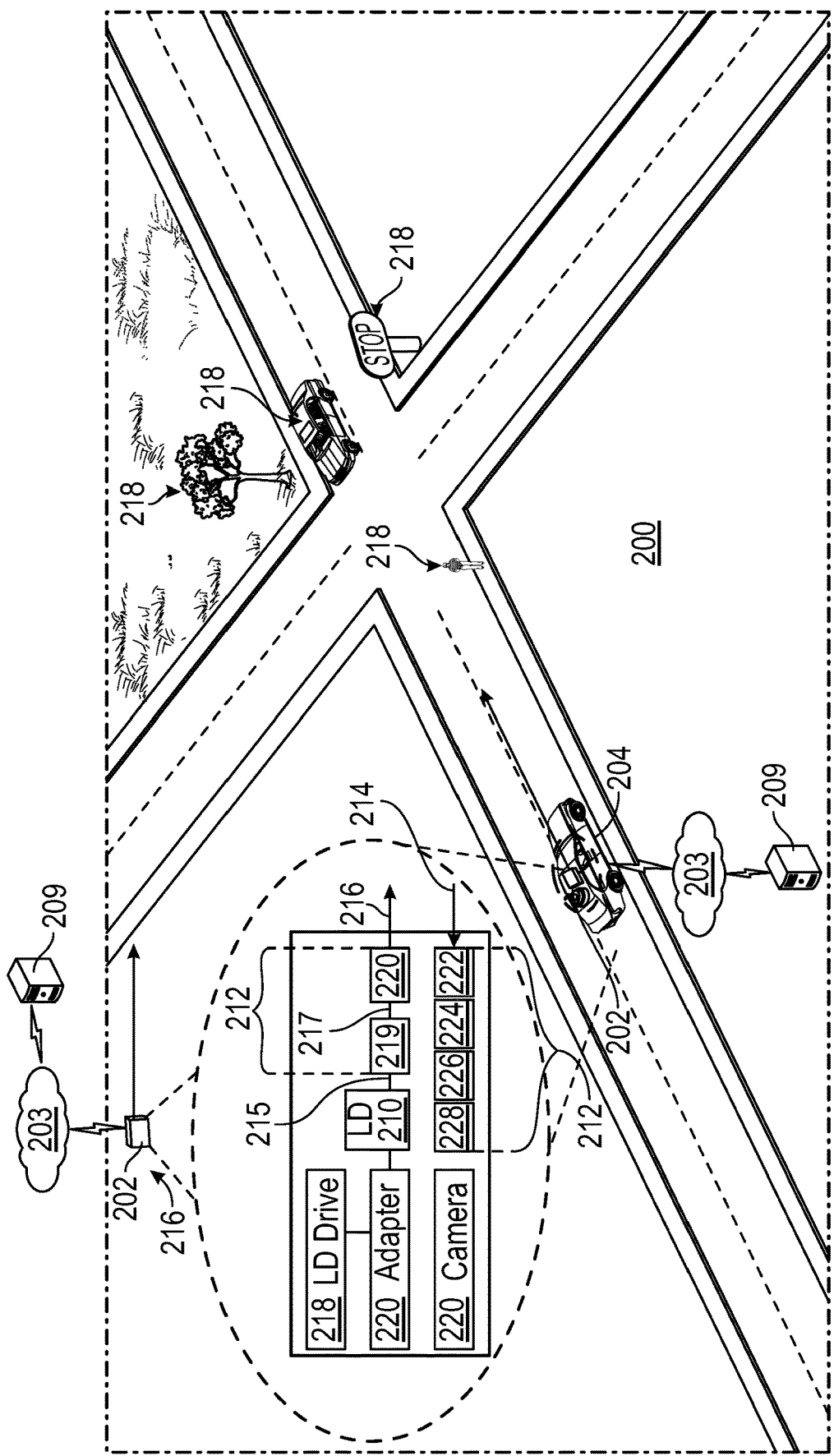
FIG. 2 depicts a schematic illustration of an example detailed system implemented in an environment, in accordance with one or more example embodiments of the disclosure.

FIG. 2 depicts a more detailed schematic illustration of the example reflectance measurement system 102. Thus, some of the elements depicted in FIG. 2 may be the same as, or similar to, some of the elements depicted in FIG. 1. For example, reflectance measurement system 202 may be the same as reflectance measurement system 102, vehicle 204 may be the same as vehicle 104, tri-pod 206 may be the same as tri-pod 106, and objects 218 may be the same as objects 118. Additionally, within the reflectance measurement system 102, camera 232 may be the same as camera 108, optical elements 212 may be the same as optical elements 112, and emitting device 210 may be the same as emitting device 110. Furthermore, emitted light 216 may be the same as emitted light 116 and return light 214 may be the same as return light 114. FIG. 2 may differ from FIG. 1, however, in that it may depict one or more networks 203, one or more computing devices 209, and/or additional elements depicted within the reflectance measurement system 202, such as more detailed depictions of the one or more optical elements 112 (shown as optical elements 212).

In some embodiments, a network 203, which may be a wireless or wired network, may be used to facilitate communications between any of the components depicted in FIG. 2 (e.g., reflectance measurement system 202, computing device 209, etc.). The network 203 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the one or more networks may have any suitable communication range associated therewith and may include, for example, global networks (e.g., the Internet), metropolitan area networks (MANs), wide area networks (WANs), local area networks (LANs), or personal area networks (PANs). In addition, the one or more networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In some embodiments, a computing device 209 may be a local or remote device (e.g., such as a local computer or a remote server) that may be used for various purposes, such as storing reflectance data captured by the reflectance measurement system 202 and/or making any determinations based on the stored reflectance data. In some instances, the computing device 209 may be the same as computing portion 513 described below with respect to FIG. 5. That is, the computing device 209 may be a part of a LIDAR system. However, the computing device 209 may also be remote from the LIDAR system, as is also described respect to FIG. 5 below.

In some embodiments, the reflectance measurement system 202 may depict more detailed configurations of the optical elements 212 (e.g., optical elements 112 described with respect to FIG. 1), and also may depict additional elements used in conjunction with the emitting device 210 (e.g., emitting device 110 described with respect to FIG. 1). With regards to the optical elements 212, and within the path of the emitted light 216, FIG. 2 may depict two particular optical elements 212, which may include a collimator 230 and a first polarization waveplate 220. As described above, these optical elements 212 in the path of the emitted light 216 may serve to alter the emitted light 216 before it enters the environment 200 and travels towards an object 218 of interest. To this end, the collimator 218 may serve to collimate the emitted light 216. Collimating light may refer to receiving rays of light that include divergence in one or more directions and outputting the rays of light as parallel rays (e.g., Minimizing the divergence of the light in the different direction). Collimating the emitted light 216 may ensure that more of the emitted light 216 lands on the object 118 instead of diverging outwards with some of the light missing the object 218. The first polarization waveplate 220 may serve to adjust the polarization of the emitted light 216 before it enters the environment 200. Adjusting the polarization of the emitted light 216 may be desirable because the reflectance of an object 218 can be polarization-sensitive (that is, the reflectance of the objects can depend on the polarization of the light that is emitted towards the object 218). Thus, it may be useful to obtain reflectance information for an object 218 at when it is illuminated with light in different polarizations states. As a specific example, it may be useful to obtain reflectance information for an object 218 at a in a particular polarization state because sensors in a LIDAR system may be configured to detect light of a single type of polarization (e.g., s polarized light or p polarized light). Thus, the first polarization waveplate 220 may be used to ensure that the emitted light 216 is in that particular polarization state before entering the environment 200 and illuminating the object 218. Additionally, the first polarization waveplate 220 can be used to cause the emitted light 216 to enter the environment 200 in multiple polarization states if it is desirable to capture reflectance information for an object 218 that is illuminated by light of the multiple polarization states (e.g., both s and p polarized light). That is, capturing data regarding how the reflectance of the object 218 changes when light of different polarization states is used may serve to increase the understanding of how the reflectance of the object 218 may change in different scenarios. For example, a particular object may be more or less reflective for a given polarization state. Understanding that would provide information about which polarization state would be most optimal for a LIDAR architecture. If a general trend is observed, such that the majority of objects we care about are more reflective in a given polarization state, this may be chosen as a requirement for a LIDAR system.

In some embodiments, the more detailed optical elements 212 depicted in FIG. 2 may also include optical elements in the path of the return light 214 (that is, light being captured by the camera 232 as an image). The optical elements 212 in the path of the return light 214 may include, for example, a second polarization waveplate 222, a neutral density filter 224, a bandpass filter 226, and/or a lens 228, but may also include any other number or combination of optical elements. In some instances, the second polarization waveplate 222 may serve a similar purpose as the first polarization waveplate 222. That is, the second polarization waveplate 222 may ensure that the polarization of the return light 214 is in a desired polarization state. For example, as described above with respect to the first polarization waveplate 222, a LIDAR system may be configured for a particular polarization state. Thus, the second waveplate 222 may serve to ensure that the return light 214 captured by the camera 232 is in the correct polarization state for that LIDAR system so the reflectance data associated with the object 218 is usable by the LIDAR system in making range determinations for the object 218. Although the first polarization waveplate 220 may ensure that the emitted light 216 is in the desired polarization state, light that is reflected from an object 218 may return in a mixed polarization. For example, even if the emitted light 216 leaves the first waveplate 220 as s polarized light, the light may return from the object 218 as p polarized and s polarized light. In this case, the waveplate 220 may ensure that only the s polarized light would be captured by the camera (in this example, it is assumed that the s polarized light is the desired polarization state to be captured). In some embodiments, a NDF 224 may be an additional optical element 212 that may be configured to reduce the amount of return light 214 that enters the camera 232. In other words the NDF may "darken" the environment by reducing the number of photons that are able to pass through the NDF and towards the camera 232. This may serve the benefit of mitigating the chance that the return light 214 may saturate the camera 232. In some embodiments, the bandpass filter 224 may further serve to reduce the amount of return light 214 that reaches the camera 232. In particular, the bandpass filter 224 may be configured to only allow wavelengths within a particular range to pass through and towards the camera 232. That is, the bandpass filter 224 may be configured to allow return 214 light corresponding to the wavelength of the emitted light 216, but may block return light 214 at other wavelengths. This may prevent unwanted light from being captured by the camera 232. For example, this may prevent excessive sunlight from being captured by the camera 232 on a sunny day. Finally, the lens 228 may be an optical element(s) 212 that is used to focus the return light 214 towards the camera. It should be noted that although the optical elements 212 depicted in FIG. 2 may be described as including particular types of optical elements, any number or combination of different types of optical elements, even those not described herein, may also be used.

In some embodiments, the more detailed reflectance measurement system 202 may also depict additional elements used in conjunction with the emitting device 210 (e.g., emitting device 110 described with respect to FIG. 1). Such additional elements may include, for example, an emitting device driver 228 and an adapter circuit board 230. The emitting device driver 228 may be a circuit that is used to provide a driving signal to the emitting device 210 in order to cause the emitting device 210 to emit light in a continuous waveform of a series of pulses. The adapter circuit board 230 may serve as an interface between the emitting device driver 228 and the emitting device 210. Different types of emitting devices 210 may be used, so the adapter circuit board 230 may ensure that the emitting device driver 228 is able to properly interface with any of these different types of emitting devices 210. Additionally, FIG. 2 may illustrate that in some cases different components of the reflectance measurement system 202 (and the reflectance measurement system 102) may be connected through one or more connection lines 215 and/or may be separated by free space 217. More particularly, the connection lines 215 may include fiber optic cables and the free space 217 may be representative of two elements being free space elements. Any of the various elements described herein for the reflectance measurement system 202 may have either of these connection types. For example, the specific embodiment of the reflectance measurement system 202 depicted in FIG. 2 shows at least the emitting device 210 and the collimator 219 being connected with a fiber optic connection line 215, whereas the remaining optical elements 212 are free space elements and not connected with a fiber optic connection line 215. The use of fiber optics or free space may depend on the specific components that are used in the reflectance measurement system 202. For example, particular types of emitting devices may be configured to use fiber optic cables, whereas particular types of optical elements 212 may be configured as free space elements. However, any combination of connection lines 215 and/or free space 217 may be used with any of the elements of the reflectance measurement system 202.

Figure 3:
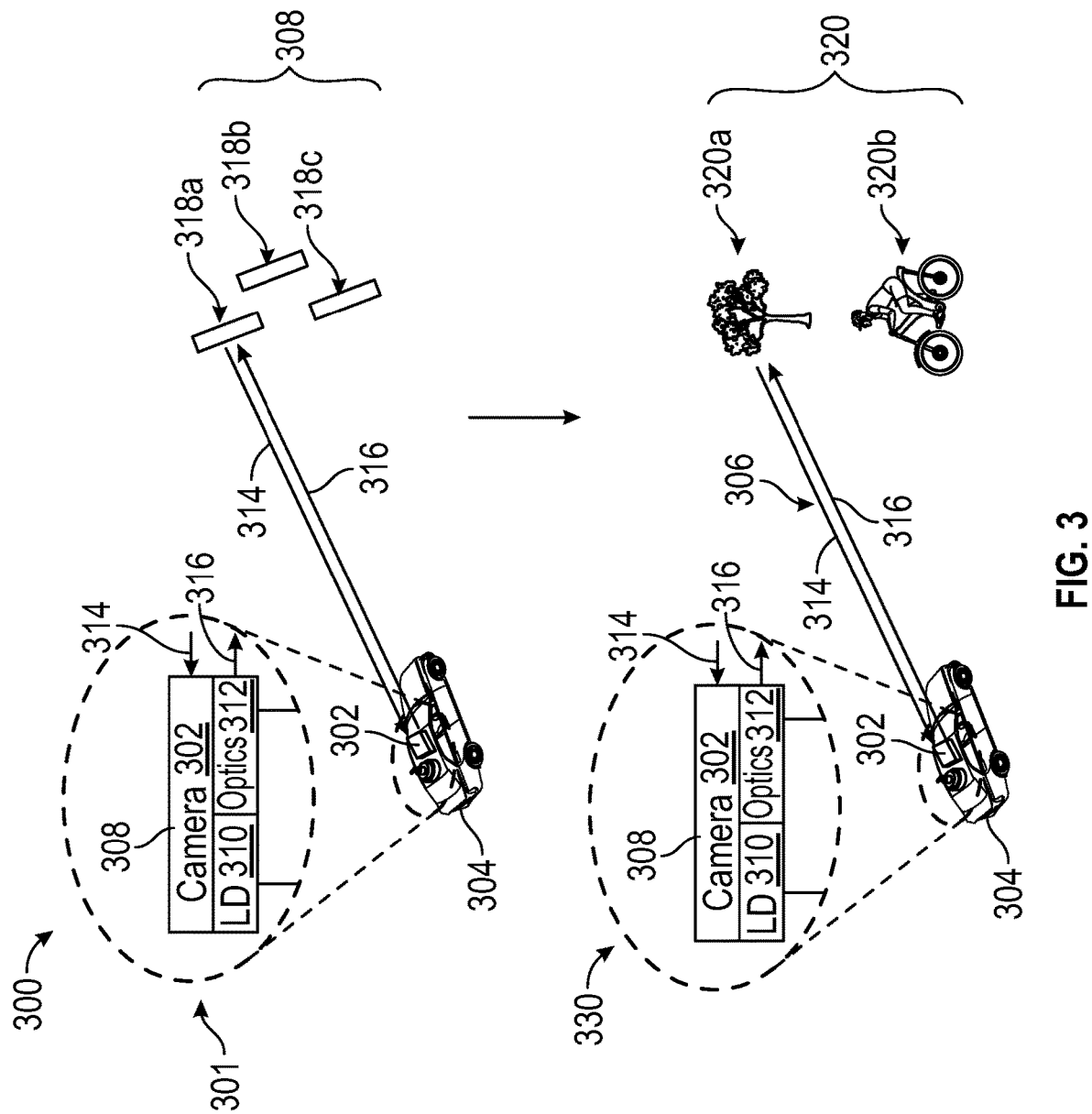
FIG. 3 depicts exemplary calibration method for a system, in accordance with one or more example embodiments of the disclosure.

FIG. 3 depicts an example calibration process 300 for a reflectance measurement system 302. The calibration process 300 may be used to calibrate a reflectance measurement system 302 to ensure that the reflectance measurement system 302 is functioning properly before the reflectance measurement system 302 is used to capture reflectance information for real-world objects 320. Some of the elements depicted in FIG. 3 may the same or similar to elements depicted in FIG. 1 and/or FIG. 2. For example, reflectance measurement system 302 may be the same as reflectance measurement system 102 and/or reflectance measurement system 202, vehicle 304 may be the same as vehicle 104 and/or vehicle 204, emitted light 316 and return light 314 may be the same as emitted light 216 and/or emitted light 116 and return light 214 and/or return light 114 respectively, camera 308 may be the same as camera 108 and/or camera 232, emitting device 210 may be the same as emitting device 110 and/or demitting device 210, optical elements 312 may be the same as optical elements 112 and/or optical elements 212, etc.

In some embodiments, the calibration process 300 may begin at 301 with the emitting device 310 emitting light in a continuous waveform of as a series of pulses, shown in the figure as emitted light 316. The emitted light 316 may pass through one or more optical elements 312, which may include any number and/or arrangement of optical elements 312, such as the optical elements 212 described with respect to FIG. 2, for example. The emitted light 316 may traverse an environment towards one or more test objects 318. The test objects 318 may be objects with known properties, such as a known shape, size, and reflectance under different scenarios (e.g., the reflectance of the test objects 318 may be known for various wavelengths of light, polarization states of light, etc.). In some instances, emitted light 316 may be directed at one of the test objects 318 at a time (for example, a first emitted light 316 may be directed towards a first test object 318a). The emitted light 316 may then illuminate the first test object 318a at a particular wavelength, and the camera 308 may be used to capture an image of the first test object 318a, similar to the manner in which the camera 308 would capture an image of a real-world object 320 during illumination. The reflectance information captured with respect to the test object 318a may then be compared to the known reflectance information of the test object 318a. For example a reflectance distribution, average reflectance, and/ or any other captured and/or determined reflectance information may be compared. If the determined and known reflectance information is identical or only differs by a threshold amount, then additional calibration may not be required and the reflectance measurement system may be deemed ready for use on real-world objects. However, if the determined and known reflectance information is not identical or differ by more than the threshold amount, then the reflectance measurement tool may need to be adjusted (for example, as explained above), and the calibration process may need to be performed again to determine if the adjustment results in more accurate reflectance distribution mappings. This process may be repeated iteratively for any other test objects that may exist (e.g., test object 318b, and/or 318c). Each individual test object may have its own distinct reflectance distribution. The use of multiple test objects 318 may serve as further verification that the system 302 is properly capturing the reflectance distribution of an object. Additionally, instead of testing only one test object 318 at a time, the calibration process 300 may involve emitting light towards multiple test objects 318 at once.

FIG. 3 may also depict that, subsequent to determining that the reflectance measurement system 302 is properly calibrated, the reflectance measurement system 302 may proceed at 330 with capturing reflectance distributions and other relevant data for real-world objects in an environment. For example, instead of capturing reflectance distributions 302 for one or more test objects 318, the reflectance measurement system 302 may be able to capture reflectance distributions for a tree 320a, a pedestrian 320b, and/or any other type of real-world object that may include a natural curvature or other non-flat shape.

Figure 4:
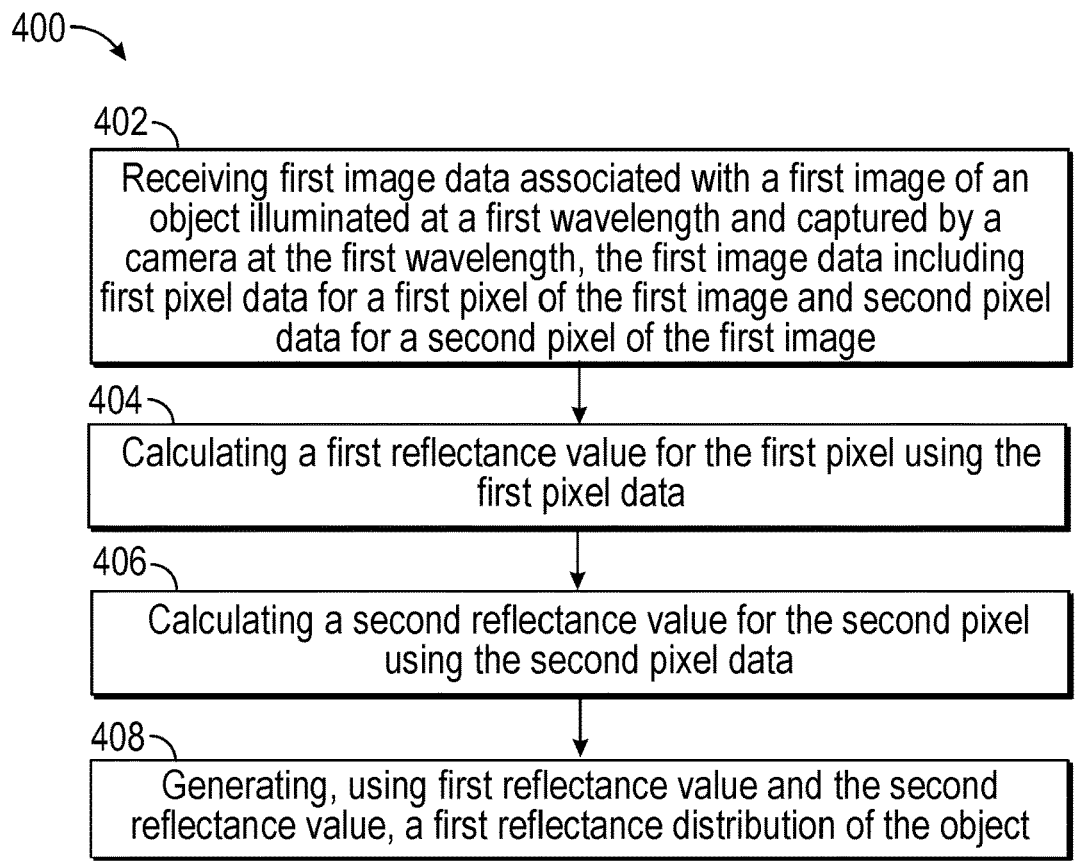
FIG. 4 depicts an example method, in accordance with one or more example embodiments of the disclosure.

FIG. 4 is an example method 400 for reflectance determinations in accordance with one or more example embodiments of the disclosure.

At block 402 of the method 400 in FIG. 4, the method may include receiving first image data associated with a first image of an object illuminated at a first wavelength and captured by a camera at the first wavelength, the first image data including first pixel data for a first pixel of the first image and second pixel data for a second pixel of the first image. The first pixel and second pixel may be pixels on the image associated with the object. The light may be emitted at a particular wavelength, and the wavelength may either be fixed or dynamic in that different wavelengths may be emitted at different times and/or different wavelengths may be emitted simultaneously. It may be desirable for the wavelength of the emitted light to be dynamic because the reflectance of an object may differ depending on the wavelength of the light that strikes the object. Thus, capturing data regarding how the reflectance of an object will differ at various wavelengths that fall into different spectrums may be important.

In some embodiments, the light may pass through one or more optical elements which may include at least a collimator and a first polarization waveplate, as well as any other number or combination of optical elements. As described above, these optical elements in the path of the emitted light may serve to alter the emitted light before it enters the environment and travels towards an object of interest. To this end, the collimator may serve to collimate the emitted light. Collimating light may refer to receiving rays of light that include divergence in one or more directions and outputting the rays of light as parallel rays (e.g., minimizing the divergence of the light in the different direction). Collimating the emitted light may ensure that more of the emitted light lands on the object instead of diverging outwards with some of the light missing the object. The first polarization waveplate may serve to adjust the polarization of the emitted light before it enters the environment. Adjusting the polarization of the emitted light may be desirable because the reflectance of an object can be polarization-sensitive (that is, the reflectance of the objects can depend on the polarization of the light that is emitted towards the object). Thus, it may be useful to obtain reflectance information for an object at when it is illuminated with light in different polarizations states. As a specific example, it may be useful to obtain reflectance information for an object in a particular polarization state since sensors in a LIDAR system may be configured to detect light of a single type of polarization (e.g., s polarized light or p polarized light). Thus, the first polarization waveplate may be used to ensure that the emitted light is in that particular polarization state before entering the environment and illuminating the object. Additionally, the first polarization waveplate can be used to cause the emitted light to enter the environment in multiple polarization states if it is desirable to capture reflectance information for an object that is illuminated by light of the multiple polarization states (e.g., both s and p polarized light). That is, capturing data regarding how the reflectance of the object changes when light of different polarization states is used may serve to increase the understanding of how the reflectance of the object may change in different scenarios.

In some embodiments camera may be used to capture an image of an object at which the emitted light is directed. That is, the emitted light may be used to illuminate the object at the first wavelength, and the camera may be used to capture an image of the object while it is illuminated by the emitted light at the first wavelength. Accordingly, the type of camera that is used to perform the image capture may depend on the spectrum in which the wavelength of the emitted lights falls. This may be to ensure that the camera is able to capture the image of the object at the particular wavelength that is used to illuminate the object. For example, the wavelength of the emitted light may be 905 nm. This may fall in the near infrared (NIR) spectrum, which may include wavelengths in the range of 780 nm to 2500 nm. With this particular wavelength of emitted light, the camera may be an NIR camera. However, other wavelengths may be used that may fall into other spectrums as well. For example, the wavelength may fall in the visible spectrum of 380 nm to 740 nm. In such cases, the camera may be a visible light camera instead of an NIR camera. Additionally, in some instances multiple cameras may be used to capture illuminations that are at different wavelengths in different spectrums, or simultaneously capture an illumination in one wavelength or multiple wavelengths at the same time. Finally, in some cases, any other device other than a camera may be used that is able to capture images of the object at any desired wavelength.

In some embodiments, the camera and the emitter device may be components of a reflectance measurement system (e.g., reflectance measurement system 102, 202, and/or 302), such that the method of FIG. 4 may be a method implementation of the reflectance measurement system as described in at least FIGS. 1-3. Thus, in some embodiments there may be optical elements in the path of the return light (that is, light being captured by the camera as an image). The optical elements in the path of the return light may include, for example, a second polarization waveplate, a neutral density filter, a bandpass filter, and/or a lens, but may also include any other number or combination of optical elements. In some instances, the second polarization waveplate may serve a similar purpose as the first polarization waveplate. That is, the second polarization waveplate may ensure that the polarization of the return light is in a desired polarization state. For example, as described above with respect to the first polarization waveplate, a LIDAR system may be configured for a particular polarization state. Thus, the second waveplate may serve to ensure that the return light captured by the camera is in the correct polarization state for that LIDAR system so the reflectance data associated with the object is usable by the LIDAR system in making range determinations for the object. Although the first polarization waveplate ensures that the emitted light is in the desired polarization state, light that is reflected from an object may return in a mixed polarization. For example, even if the emitted light leaves the first waveplate as s polarized light, the light may return from the object as p polarized and s polarized light. In this case, the waveplate may ensure that only the s polarized light would be captured by the camera (in this example, it is assumed that the s polarized light is the desired polarization state to be captured). In some embodiments, the NDF may be an additional optical element that may be configured to reduce the amount of return light that enters the camera. In other words the NDF may "darken" the environment by reducing the number of photons that are able to pass through the NDF and towards the camera. This may serve the benefit of mitigating the chance that the return light may saturate [the camera?] for a given object of interest. In some embodiments, the bandpass filter may further serve to reduce the amount of return light that reaches the camera. In particular, the bandpass filter may be configured to only allow wavelengths within a particular range to pass through and towards the camera. That is, the bandpass filter may be configured to allow return light corresponding to the wavelength of the emitted light, but may block return light at other wavelengths. This may prevent unwanted light from being captured by the camera. For example, this may prevent excessive sunlight from being captured by the camera on a sunny day. Finally, the lens may be an optical elements that is used to focus the return light towards the camera.

Block 404 of the method 400 may include calculating a first reflectance value for the first pixel using the first pixel data. Block 406 of the method 400 may include calculating a second reflectance value for the second pixel using the second pixel data. Block 408 of the method 400 may include generating, using first reflectance value and the second reflectance value, a first reflectance distribution of the object. The first reflectance value may represent the reflectance of the object at different locations on the object. Additionally, the terms "calculating" may refer to performing one or more mathematical operations, or may also refer to simply receiving information indicative of reflectance values for particular pixels. Additional reflectance information may also be determined as well. For example, an average reflectance for the object as a whole may be determined (e.g., which may be represented as a single numerical value), a spatial distribution, a statistical distribution, and/or any other relevant information. Additionally, such reflectance information can be captured for light of different wavelengths, polarization states, etc. as described above.

In some embodiments, reflectance may be a measure of the incident electromagnetic radiation that is reflected by a given interface. Reflectance may be representative of the intensity of light reflected from a particular portion of an object at a given angle. The reflectance of a particular object or instance of material refers to the ratio of the total amount of light or electromagnetic radiation that is reflected from the object's surface compared to the total amount originally incident upon it. Reflectivity may be calculated based on the wavelength of light, the reflected radiation, and the incident radiation. Reflectance may be calculated as a square of the reflectivity value. It should be noted that while the disclosure may refer to calculating or storing reflectance or reflectivity information in some instances, either or (or both) of these two properties may similarly be applicable. For example, a description of a reflectance calculation may also be replaced with a reflectivity calculation, or both calculations may be made. Reflectivity and reflectance values for an object at different wavelengths of illumination and at different portions of the object may also be determined through any other suitable methods for determining these values.

In some embodiments, once all of this relevant information is determined based on the captured image, it may be stored locally within the reflectance measurement system and/or remotely to the reflectance measurement system. In some instances, the information may be stored in a database (which may be referred to interchangeably herein as a "library," "object library," or the like). The database may include classifications of objects (e.g., a car, a tree, a pedestrian, a vehicle, or any other real-world object that may be encountered in an environment), and the reflectance information for an object may be added to database entries for the object classification associated with that object. Thus, the determined reflectance information associated with the object may serve as supplemental information that provides an additional base of knowledge with respect to the object classification. As mentioned above, this may be especially useful in vehicle LIDAR systems, as the LIDAR system may be able to make more accurate range determinations if the reflectance of a particular object is known for various points on the object at various angles (among other factors, such as the wavelength used, the polarization state of the light, etc.). In other words, the reflectance measurement system may be used to compile a library or catalog of reflectance information for particular objects that may be encountered by a LIDAR system in an environment. This catalog may then be accessible to the LIDAR system such that the LIDAR system may access reflectance distribution information in real-time for objects that the LIDAR system may encounter while functioning in the real world. The reflectance information may also be used to verify the functioning of a LIDAR system. For example, the LIDAR system and the reflectance measurement system can both be used to image an object under the same conditions and the reflectance information obtained by the reflectance measurement system can be compared to the reflectance information obtained by the LIDAR system. Based on this comparison, it may be determined if the LIDAR system is functioning within a threshold level of performance. If not, adjustments may be made to the LIDAR system.

In some embodiments, the method 400 may also include receiving second image data associated with a second image of the object illuminated at a second wavelength and captured by a camera at the second wavelength, the second image data including third pixel data for a third pixel of the second image and fourth pixel data for a fourth pixel of the image. The method 400 may also include calculating a third reflectance value for the third pixel using the third pixel data. The method 400 may also include calculating a fourth reflectance value for the fourth pixel using the fourth pixel data. The method 400 may also include generating, using third reflectance value and the fourth reflectance value, a second reflectance distribution of the object, wherein the second reflectance distribution is based on the object being illuminated by the second wavelength. The method 400 may also include storing the second reflectance distribution of the object in an object library with the first reflectance distribution of the object. In some cases, the camera may be the same as the camera used to capture the first image described above. The camera may also be a different camera. That is, one camera may be configured to capture images at multiple wavelengths, or two cameras may be used that are configured to capture images at the separate wavelengths. Additionally, any other device other than a camera may also be used. Additionally, the third pixel and the fourth pixel may be associated with the same location on the object as the first pixel and second pixel (or may be associated with different locations). For example, if the object is a tree, then the first pixel and third pixel may be pixels at a first location on the tree and the second pixel and fourth pixel may be associated with a second location on the tree. In some cases, the fourth pixels may all be associated with different locations on the object, or some of the pixels may be associated with the same location on the object. The reflectance distribution for an object may be determined for different wavelengths of illumination. The reflectance properties of the object may vary depending on the wavelength of light it is illuminated by, so it may be important to store information about how the reflectance properties change. This may be important, for example, in autonomous vehicle systems that may be capturing information about objects under different illumination conditions. If the autonomous vehicle is only aware of reflectance information for the object under one specific illumination condition, then the autonomous vehicle may not be able to appropriately identify the object under other illumination conditions. IN some cases, the different wavelengths may represent different light spectrums, such as visible light and/or near infrared (NIR), to name two non-limiting examples.

The operations described and depicted in the illustrative process flow of FIG. 4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 5:
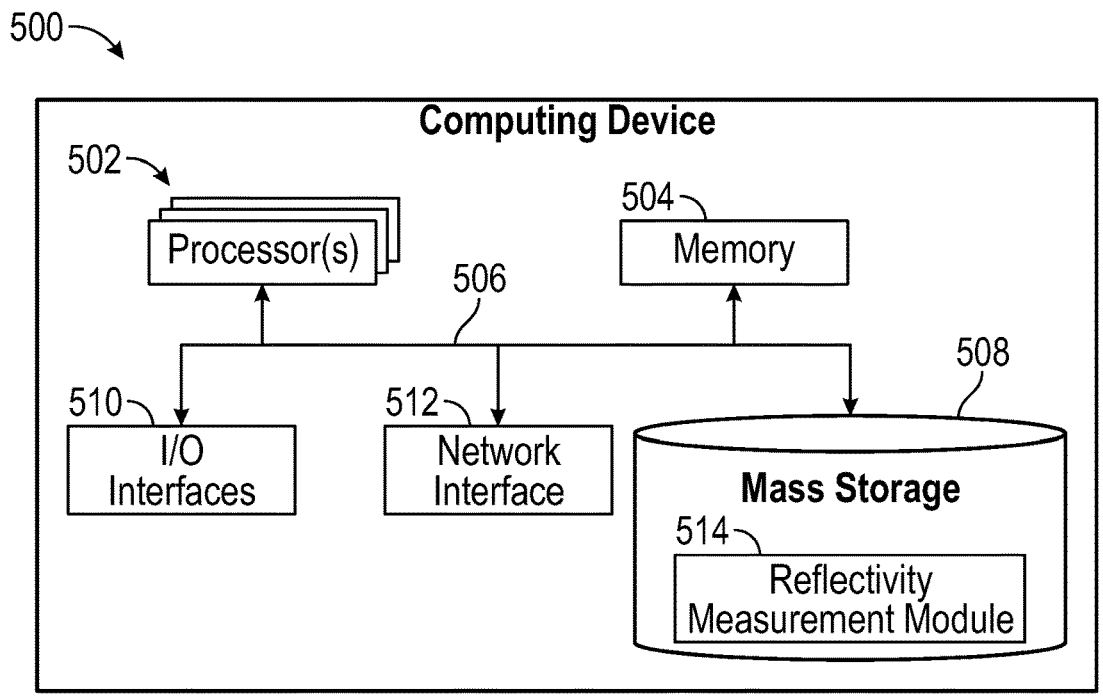
FIG. 5 depicts an example computing system, in accordance with one or more example embodiments of the disclosure.

FIG. 5 illustrates an example LIDAR system 500, in accordance with one or more embodiments of this disclosure. The LIDAR system 500 may be representative of any number of elements described herein, such as the LIDAR system 100 described with respect to FIG. 1, as well as any other LIDAR systems described herein. The LIDAR system 500 may include at least an emitter portion 501, a detector portion 505, and a computing portion 513.

In some embodiments, the emitter portion 501 may include at least one or more emitter(s) 502 (for simplicity, reference may be made hereinafter to "an emitter," but multiple emitters could be equally as applicable) and/or one or more optical element(s) 504. An emitter 502 may be a device that is capable of emitting light into the environment. Once the light is in the environment, it may travel towards an object 512. The light may then reflect from the object and return towards the LIDAR system 500 and be detected by the detector portion 505 of the LIDAR system 500 as may be described below. For example, the emitter 502 may be a laser diode as described above. The emitter 502 may be capable of emitting light in a continuous waveform or as a series of pulses. An optical element 504 may be an element that may be used to alter the light emitted from the emitter 502 before it enters the environment. For example, the optical element 504 may be a lens, a collimator, or a waveplate. In some instances, the lens may be used to focus the emitter light. The collimator may be used to collimate the emitted light. That is, the collimator may be used to reduce the divergence of the emitter light. The waveplate may be used to alter the polarization state of the emitted light. Any number or combination of different types of optical elements 504, including optical elements not listed herein, may be used in the LIDAR system 500.

In some embodiments, the detector portion 505 may include at least one or more detector(s) 506 (for simplicity, reference may be made hereinafter to "a detector," but multiple detectors could be equally as applicable) and/or one or more optical elements 508. The detector may be a device that is capable of detecting return light from the environment (e.g., light that has been emitted by the LIDAR system 500 and reflected by an object 512). For example, the detectors may be photodiodes. The photodiodes may specifically include Avalanche Photodiodes (APDs), which in some instances may operate in Geiger Mode. However, any other type of photodetector may also be used. The functionality of the detector 506 in capturing return light from the environment may serve to allow the LIDAR system 100 to ascertain information about the object 512 in the environment. That is, the LIDAR system 100 may be able to determine information such as the distance of the object from the LIDAR system 100 and the shape and/or size of the object 512, among other information. The optical element 508 may be an element that is used to alter the return light traveling towards the detector 506. For example, the optical element 508 may be a lens, a waveplate, or filter such as a bandpass filter. In some instances, the lens may be used to focus return light on the detector 506. The waveplate may be used to alter the polarization state of the return light. The filter may be used to only allow certain wavelengths of light to reach the detector (e.g., a wavelength of light emitted by the emitter 502). Any number or combination of different types of optical elements 508, including optical elements not listed herein, may be used in the LIDAR system 500.

In some embodiments, the computing portion 513 may be the same as the computing device 209 described with respect to FIG. 2 above. The computing portion may be located internally to the LIDAR system 500 or may also be located remotely to the LIDAR system 500. The computing portion 513 may include one or more processor(s) 514 and memory 516. The processor 514 may execute instructions that are stored in one or more memory devices (referred to as memory 516). The instructions can be, for instance, instructions for implementing functionality described as being carried out by one or more modules and systems disclosed above or instructions for implementing one or more of the methods disclosed above. The processor(s) 514 can be embodied in, for example, a CPU, multiple CPUs, a GPU, multiple GPUs, a TPU, multiple TPUs, a multi-core processor, a combination thereof, and the like. In some embodiments, the processor(s) 514 can be arranged in a single processing device. In other embodiments, the processor(s) 514 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 514 can access the memory 516 by means of a communication architecture (e.g., a system bus). The communication architecture may be suitable for the particular arrangement (localized or distributed) and type of the processor(s) 514. In some embodiments, the communication architecture 506 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 516 also can retain data.

Each computing device 500 also can include mass storage 517 that is accessible by the processor(s) 514 by means of the communication architecture 506. The mass storage 517 can include machine-accessible instructions (e.g., computer-readable instructions and/or computer-executable instructions). In some embodiments, the machine-accessible instructions may be encoded in the mass storage 517 and can be arranged in components that can be built (e.g., linked and compiled) and retained in computer-executable form in the mass storage 517 or in one or more other machine-accessible non-transitory storage media included in the computing device 500. Such components can embody, or can constitute, one or many of the various modules disclosed herein. Such modules are illustrated as reflectance analysis module 520.

The reflectance analysis module 520 may include computer-executable instructions, code, or the like that responsive to execution by one or more of the processor(s) 514 may perform functions including, but not limited to, analyzing reflectance data provided by a reflectance measurement system (e.g., Reflectance measurement system 102, 202, and or any other reflectance measurement system described herein), determining reflectance information for an object based on the reflectance data, such as a reflectance distribution map for the data, an average reflectance for the object, etc., sending determined reflectance information to a database for storage, among various other operations.

It should further be appreciated that the LIDAR system 500 may include alternate and/or additional hardware, software, or firmware components beyond those described or depicted without departing from the scope of the disclosure. More particularly, it should be appreciated that software, firmware, or hardware components depicted as forming part of the computing device 500 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

That which is claimed is:

1. A system comprising:
   an emitter device configured to emit light at a first wavelength towards an object;
   a camera configured to capture a first image of the object illuminated at the first wavelength; and
   a processor configured to:
      receive first image data associated with the first image of the object captured by the camera, the first image data including first pixel data for a first pixel of the first image and second pixel data for a second pixel of the first image;
      calculate a first reflectance value for the first pixel using the first pixel data;
      calculate a second reflectance value for the second pixel using the second pixel data; and
      generate, using the first reflectance value and the second reflectance value, a first reflectance distribution of the object.

2. The system of claim 1, wherein the processor is further configured to:
   store the first reflectance distribution of the object in an object library.

3. The system of claim 1, wherein the emitter device is further configured to emit light at a second wavelength towards the object, and wherein the system further comprises:
   a camera configured to capture a second image of the object illuminated at the second wavelength; and
   a processor configured to:
      receive second image data associated with the second image of the object captured by the camera, the second image data including third pixel data for a third pixel of the second image and fourth pixel data for a fourth pixel of the image;
      calculate a third reflectance value for the third pixel using the third pixel data;
      calculate a fourth reflectance value for the fourth pixel using the fourth pixel data;
      generate, using third reflectance value and the fourth reflectance value, a second reflectance distribution of the object, wherein the second reflectance distribution is based on the object being illuminated by the second wavelength; and
      store the second reflectance distribution of the object in an object library with the first reflectance distribution of the object.

4. The system of claim 1, wherein the emitter device is further configured to emit light at the first wavelength towards a test object with a known reflectance distribution, wherein the light illuminates the test object at the first wavelength, and wherein the processor is further configured to:
   receive second image data associated with a second image of the object captured by the camera, the second image data including third pixel data for a third pixel of the image and fourth pixel data for a fourth pixel of the image;
   calculate a third reflectance value for the third pixel using the third pixel data;
   calculate a fourth reflectance value for the fourth pixel using the fourth pixel data;
   generate, using third reflectance value and the fourth reflectance value, a second reflectance distribution of the object; and
   compare the second reflectance distribution of the test object with the known reflectance distribution of the test object.

5. The system of claim 1, further comprising at least one of: a collimator or a first polarizing waveplate, wherein the collimator or the first polarizing waveplate are located between the emitting device and the object.

6. The system of claim 1, further comprising at least one of: a lens, a bandpass filter, or a neutral density filter, wherein the at least one of the lens, the bandpass filter, or the neutral density filter (NDF) is located between the camera and the object.

7. The system of claim 1, wherein the camera is a near-infrared (NIR) camera.

8. A method comprising:
   receiving first image data associated with a first image of an object illuminated at a first wavelength and captured by a camera at the first wavelength, the first image data including first pixel data for a first pixel of the first image and second pixel data for a second pixel of the first image;
   calculating a first reflectance value for the first pixel using the first pixel data;
   calculating a second reflectance value for the second pixel using the second pixel data; and generating, using the first reflectance value and the second reflectance value, a first reflectance distribution of the object.

9. The method of claim 8, wherein the first reflectance distribution of the object includes a spatial reflectance distribution.

10. The method of claim 8, further comprising:
receiving second image data associated with a second image of the object illuminated at a second wavelength and captured by a camera at the second wavelength, the second image data including third pixel data for a third pixel of the second image and fourth pixel data for a fourth pixel of the image;
calculating a third reflectance value for the third pixel using the third pixel data;
calculating a fourth reflectance value for the fourth pixel using the fourth pixel data;
generating, using third reflectance value and the fourth reflectance value, a second reflectance distribution of the object, wherein the second reflectance distribution is based on the object being illuminated by the second wavelength; and
storing the second reflectance distribution of the object in an object library with the first reflectance distribution of the object.

11. The method of claim 8, further comprising:
receiving second image data associated with a second image of a test object illuminated at a second wavelength and captured by a camera at the second wavelength, the second image data including third pixel data for a third pixel of the second image and fourth pixel data for a fourth pixel of the image, wherein the test object has a known reflectance distribution;
calculating a third reflectance value for the third pixel using the third pixel data;
calculating a fourth reflectance value for the fourth pixel using the fourth pixel data;
generating, using third reflectance value and the fourth reflectance value, a second reflectance distribution of the object; and
comparing the second reflectance distribution of the test object with the known reflectance distribution of the test object.

12. The method of claim 8, further comprising at least one of: a collimator or a first polarizing waveplate, wherein the collimator or the first polarizing waveplate are located between an emitting device and the object.

13. The method of claim 8, further comprising at least one of: a lens, a bandpass filter, or a neutral density filter, wherein the at least one of the lens, the bandpass filter, or the neutral density filter (NDF) is located between the camera and the object.

14. A non-transitory computer-readable medium storing computer-executable instructions, that when executed by at least one processor, cause the at least one processor to:
receive first image data associated with a first image of an object illuminated at a first wavelength and captured by a camera at the first wavelength, the first image data including first pixel data for a first pixel of the first image and second pixel data for a second pixel of the first image;
calculate a first reflectance value for the first pixel using the first pixel data;
calculate a second reflectance value for the second pixel using the second pixel data; and
generate, using the first reflectance value and the second reflectance value, a first reflectance distribution of the object.

15. The non-transitory computer-readable medium of claim 14, wherein the computer-executable instructions are further operable to:
store the first reflectance distribution of the object and at least one additional attribute associated with the first reflectance distribution in an object library, wherein the at least one additional attribute includes at least one of an average reflectance value, a spatial reflectance level and a statistical reflectance level.

16. The non-transitory computer-readable medium of claim 14, wherein the computer-executable instructions are further operable to:
receive second image data associated with a second image of the object illuminated at a second wavelength and captured by a camera at the second wavelength, the second image data including third pixel data for a third pixel of the second image and fourth pixel data for a fourth pixel of the image;
calculate a third reflectance value for the third pixel using the third pixel data;
calculate a fourth reflectance value for the fourth pixel using the fourth pixel data;
generate, using third reflectance value and the fourth reflectance value, a second reflectance distribution of the object, wherein the second reflectance distribution is based on the object being illuminated by the second wavelength; and
store the second reflectance distribution of the object in an object library with the first reflectance distribution of the object.

17. The non-transitory computer-readable medium of claim 14, wherein the computer-executable instructions are further operable to:
receive second image data associated with a second image of a test object illuminated at a second wavelength and captured by a camera at the second wavelength, the second image data including third pixel data for a third pixel of the second image and fourth pixel data for a fourth pixel of the image, wherein the test object has a known reflectance distribution;
calculate a third reflectance value for the third pixel using the third pixel data;
calculate a fourth reflectance value for the fourth pixel using the fourth pixel data;
generate, using third reflectance value and the fourth reflectance value, a second reflectance distribution of the object; and
compare the second reflectance distribution of the test object with the known reflectance distribution of the test object.

18. The non-transitory computer-readable medium of claim 14, further comprising at least one of: a collimator or a first polarizing waveplate, wherein the collimator or the first polarizing waveplate are located between an emitting device and the object.

19. The non-transitory computer-readable medium of claim 14, further comprising at least one of: a lens, a bandpass filter, or a neutral density filter, wherein the at least one of the lens, the bandpass filter, or the neutral density filter (NDF) is located between the camera and the object.

20. The non-transitory computer-readable medium of claim 14, wherein a size of the first reflectance distribution of the object varies based on a size of the object.

* * * * *